Patented July 14, 1953

2,645,572

UNITED STATES PATENT OFFICE 2,645,572

3-THIANAPHTHENYLOXYACETIC ACID, ITS SALTS AND ESTERS, AND HERBICIDAL COMPOSITION THEREOF

Frederick F. Blicke, Washtenaw County, Mich., assignor to Regents of the University of Michigan, Ann Arbor, Mich., a corporation of Michigan No Drawing. Application December 22, 1949, Serial No. 134,617

8 Claims. (Cl. 71—2.5)

This invention relates to 3-thianaphthenyloxyacetic acid, its salts and esters, and their methods of preparation. 3-thianaphthenyloxyacetic acid may be represented by the following structural formula

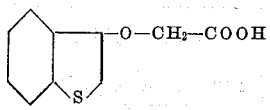

The novel compounds of this invention have been found to be exceedingly useful in the prevention of growth and the destruction of weeds. Since in such an application they are utilized in quantities of a few pounds per acre, distribution and application of these herbicides is facilitated by incorporating them in larger quantities of fertilizers, solid diluents, or soil conditioning agents and/or liquid solvents or diluents, and then applying to the area to be treated, the resultant formulations. Typical of the various substances into which the novel compounds of this invention may be incorporated to produce outstandingly effective herbicidal formulations, are inorganic and organic fertilizers and manures, such as ammonium sulfate, basic slag, potash salts, superphosphates, peat, and hop manures. Hydrated lime, ground lime, chalk, sand, talc or clay may also be used. Liquid formulations may be prepared by dispersing or dissolving the novel compounds of this invention in water, petroleum oils, and various other organic solvents. In addition, such formulations may also have incorporated therein, to facilitate application, various wetting, dispersing and emulsifying agents, such as the alkyl aryl sulfonates, sulfated fatty alcohols, alkyl sulfonates, sulfated esters and acids, amide sulfates and sulfonates, sulfated and sulfonated oils, fats, and waxes, fatty acid esters of glycerol and glycol and other polyhydric alcohols such as sorbitol, and condensation products of ethylene oxide with fatty acids, abietic acid, alkyl phenols such as nonyl phenol, and mercaptans such as tertiary dodecyl mercaptan.

Within the scope of this invention, the expression "salts of 3-thianaphthenyloxyacetic acid" is meant to include the alkali metal and alkaline earth metal salts such as sodium, potassium, lithium, ammonium, magnesium, calcium, the salts of other metals such as copper and iron, and the substituted organic ammonium salts such as the salts of methylamine, trimethylamine, triethylamine, diethylamine, monoethanolamine, triethanolamine, isopropanolamine, pyridine, and the like.

Within the scope of this invention, the expression "esters of 3-thianaphthenyloxyacetic acid" is meant to include any ester of 3-thianaphthenyloxyacetic acid with any monohydric or polyhydric alcohol which may be either saturated or unsaturated. Typical of such alcohols are primary alkyl alcohols such as methyl alcohol, ethyl alcohol, propyl alcohol, butyl alcohol, amyl alcohol, hexyl alcohol, heptyl alcohol, octyl alcohol, nonyl alcohol, decyl alcohol, undecyl alcohol, dodecyl alcohol, tetradecyl alcohol, cetyl alcohol, and octadecyl alcohol; secondary alkyl alcohols such as isopropyl alcohol, secondary butyl alcohol, secondary amyl alcohol, secondary hexyl alcohol, secondary octyl alcohol and secondary nonyl alcohol; tertiary alkyl alcohols such as tertiary butyl alcohol, tertiary amyl alcohol, tertiary butyl carbinol and tertiary amyl carbinol; the ether alcohols such as ethylene glycol monomethyl ether, ethylene glycol monoethyl ether, and ethylene glycol mono-2-ethylhexyl ether; aromatic alcohols such as benzyl alcohol and methylphenylcarbinol; alicyclic alcohols such as cyclohexanol, cyclobutyl carbinol and cyclopentanol; heterocyclic alcohols such as furfuryl and tetrahydrofurfuryl alcohols; unsaturated aliphatic alcohols such as allyl alcohol, methallyl alcohol, crotyl alcohol and propargyl alcohol; substituted alcohols such as ethylene chlorohydrin, cyanohydrin and 2-bromoethanol; polyhydric alcohols such as ethyleneglycol, diethyleneglycol, glycerol, erythritol, pentaerythritol, and the like.

The novel esters and salts of this invention may be conveniently prepared by reacting the alkali metal salt of 3-hydroxythianaphthene with an ester or salt of chloroacetic acid in a suitable medium. 3-thianaphthenyloxyacetic acid may be prepared by acidification of the salt of 3-thianaphthenyloxyacetic acid or by alkaline hydrolysis followed by acidification of an ester of 3-thianaphthenyloxyacetic acid.

The following examples are illustrative of the novel compounds of this invention:

EXAMPLE I

*Methyl 3-thianaphthenyloxyacetate*

A solution of 30.0 g. of 3-hydroxythianaphthene in 200 ml. of absolute methanol was boiled under reflux conditions, in a nitrogen atmosphere, and a sodium methylate solution, which had been prepared from 5.1 g. of sodium and 100 ml. of absolute methanol added. After the addition of 27.1 g. of methyl chloroacetate, dissolved in 50 ml. of methanol, the mixture was boiled under reflux conditions for 10 hours. The excess alcohol was then removed from the reaction mixture by distillation. The residue which remained after removal of the alcohol was dissolved in ether and the solution filtered. The filtrate was then fractionally distilled, recovering unreacted 3-hydroxythianaphthene and 20.2 g. of the methyl ester of 3-thianaphthenyloxyacetic acid. The methyl 3-thianaphthenyloxyacetate thus obtained was recrystallized from petroleum ether. The purified ester had the following properties:

Melting point _____ °C __ 49–50
Saponification equivalent:
    Calculated for: $C_{11}H_{10}O_3S$ _____ 222.3
    Found _____ 221.7

EXAMPLE II

*Sodium 3-thianaphthenyloxyacetate*

2.2 g. of the ester obtained in Example I was dissolved in 25 ml. of absolute ethanol. To this solution was then added a sodium ethylate solution prepared from 0.23 g. of sodium in 10 ml. of ethanol. Two drops of water were then added and the mixture was allowed to remain at room temperature for 12 hours. The precipitate which formed was filtered and an 82% yield of sodium 3-thianaphthenyloxyacetate recovered.

EXAMPLE III

*3-thianaphthenyloxyacetic acid*

A small portion of the sodium salt formed in Example II was dissolved in water and the solution acidified with hydrochloric acid. The crystalline precipitate of 3-thianaphthenyloxyacetic acid which formed was filtered and recrystallized from a mixture of acetone-petroleum ether. The 3-thianaphthenyloxyacetic acid had the following properties:

Melting point _____ 160°–161° C.
Neutralization equivalent:
    Calculated for: $C_{10}H_8O_3S$ _____ 208.2
    Found _____ 208.7
Analysis:
    Calculated for: $C_{10}H_8O_3S$ _____ S, 15.40%
    Found _____ S, 15.05%

The procedure utilized in Example I for the preparation of methyl 3-thianaphthenyloxyacetate and other esters of 3-thianaphthenyloxyacetate is subject to many variations. Preferably, the reaction is carried out in an inert organic liquid medium, by which is meant a medium which in itself does not enter into the reaction. The reaction between the alkali metal salt of 3-hydroxythianaphthene and chloroacetic acid esterified with methanol or any of the alcohols previously mentioned may be carried out over a wide temperature range. Preferably, however, it is carried out at elevated temperatures in excess of 50° C. Due to the instability of 3-hydroxythianaphthene at elevated temperatures, it is preferable that the entire reaction be carried out in an inert atmosphere. The esters of 3-thianaphthenyloxyacetic acid may also be prepared by esterification of 3-thianaphthenyloxyacetic acid with any of the alcohols previously mentioned.

The sodium salt of 3-thianaphthenyloxyacetate, and other salts as previously mentioned, may be prepared according to many procedures. For example, they may be prepared by the neutralization of 3-thianaphthenyloxyacetic acid with the hydroxide of the desired cation, such as sodium, potassium, calcium or ammonium hydroxide. Such salts of 3-thianaphthenyloxyacetic acid may also be prepared by reacting 3-hydroxythianaphthene and chloroacetic acid in an aqueous medium in the presence of an excess of the hydroxide of the desired cation. From the reaction mixture thus obtained, the salt of 3-thianaphthenyloxyacetic acid may be recovered according to any of the procedures for recovering such types of salts well known to those skilled in the art.

Illustrative of the herbicidal formulations which may be prepared utilizing the novel compounds of this invention are the formulations set forth in the following examples, wherein all parts are by weight:

EXAMPLE IV

| | Parts |
|---|---|
| 3-thianaphthenyloxyacetic acid | 2 |
| Condensation product of ethylene oxide and nonyl phenol | 20 |
| Water | 978 |

EXAMPLE V

| | Parts |
|---|---|
| Sodium 3-thianaphthenyloxyacetate | 6 |
| Sulfonated castor oil | 40 |
| Water | 954 |

EXAMPLE VI

| | Parts |
|---|---|
| 3-thianaphthenyloxyacetic acid | 1 |
| Dodecyl benzene sulfonate | 1 |
| Talc | 98 |

EXAMPLE VII

| | Parts |
|---|---|
| Methyl 3-thianaphthenyloxyacetate | 5 |
| Aromatic oil | 95 |

EXAMPLE VIII

| | Parts |
|---|---|
| Methyl 3-thianaphthenyloxyacetate | 3 |
| Sulfonated alkyl phenol | 20 |
| Water | 977 |

What is claimed is:

1. A compound selected from the group consisting of 3-thianaphthenyloxyacetic acid, its salts and esters.
2. Sodium 3-thianaphthenyloxyacetate.
3. Methyl 3-thianaphthenyloxyacetate.
4. 3-thianaphthenyloxyacetic acid.
5. A herbicidal composition comprising a compound selected from the group consisting of 3-thianaphthenyloxyacetic acid, its salts and esters, and a surface active agent.
6. A herbicidal composition comprising 3-thianaphthenyloxyacetic acid and a surface active agent.
7. A herbicidal composition comprising sodium 3-thianaphthenyloxyacetate and a surface active agent.
8. A herbicidal composition comprising methyl 3-thianaphthenyloxyacetate and a surface active agent.

FREDERICK F. BLICKE.

References Cited in the file of this patent

UNITED STATES PATENTS

| Number | Name | Date |
|---|---|---|
| 2,396,513 | Jones | Mar. 12, 1946 |
| 2,453,983 | Sexton | Nov. 16, 1948 |

OTHER REFERENCES

Bausor "Amer. J. Botany," 26 (1939), p. 415.
Linser: "Planta," 28 (1938), pages 253 and 254.
Morton: "The Chemistry of Heterocyclic Compounds" (McGraw-Hill, N. Y., 1946), page 50.